US008203981B2

(12) United States Patent
Chung et al.

(10) Patent No.: US 8,203,981 B2
(45) Date of Patent: *Jun. 19, 2012

(54) WIRELESS SENSOR NETWORK WITH LINEAR STRUCTURE BEING CAPABLE OF BIDIRECTIONAL COMMUNICATION AND METHOD THEREOF

(75) Inventors: Tae-Yun Chung, Gangneung-si (KR); Han-Su Chung, Gangneung-si (KR); Jung-Ho Moon, Gangneung-si (KR)

(73) Assignee: Gangneung-Wonju National University Industry Academy Cooperation Group, Gangneung-si, Gangwon-do (KR)

( * ) Notice: Subject to any disclaimer, the term of this patent is extended or adjusted under 35 U.S.C. 154(b) by 404 days.

This patent is subject to a terminal disclaimer.

(21) Appl. No.: 12/449,103

(22) PCT Filed: Jan. 9, 2008

(86) PCT No.: PCT/KR2008/000133
§ 371 (c)(1),
(2), (4) Date: Jul. 23, 2009

(87) PCT Pub. No.: WO2008/093939
PCT Pub. Date: Aug. 7, 2008

(65) Prior Publication Data
US 2010/0097988 A1 Apr. 22, 2010

(30) Foreign Application Priority Data
Jan. 29, 2007 (KR) ........................ 10-2007-0008935

(51) Int. Cl.
*H04L 5/14* (2006.01)
(52) U.S. Cl. ......... 370/294; 370/336; 370/347; 370/442

(58) Field of Classification Search .......... 370/280–281, 370/294, 337–339, 347–350, 328–338, 442–444, 370/503–545
See application file for complete search history.

(56) References Cited

U.S. PATENT DOCUMENTS

| 7,519,011 B2 * | 4/2009 | Petrus et al. ................... 370/280 |
| 7,636,341 B2 * | 12/2009 | Park .............................. 370/338 |
| 2004/0235489 A1 | 11/2004 | Kwon | |
| 2005/0152394 A1 | 7/2005 | Cho | |
| 2007/0140303 A1 * | 6/2007 | Kim et al. ..................... 370/503 |

FOREIGN PATENT DOCUMENTS

| KR | 10-2006-0052383 A | 5/2006 |
| KR | 10-2006-0111318 A | 10/2006 |
| KR | 10-0656385 B1 | 12/2006 |

* cited by examiner

*Primary Examiner* — Pao Sinkantarakorn
*Assistant Examiner* — Iqbal Zaidi
(74) *Attorney, Agent, or Firm* — The Nath Law Group; Jerald L. Meyer; Robert T. Burns

(57) ABSTRACT

Disclosed is a wireless sensor network with a linear structure capable of bidirectional communication. The wireless sensor network includes a plurality of nodes linearly connected from a sink node to a terminal node by connecting each node to a single upper-level node and a single lower-level node, each node has an active period for transmitting/receiving data to/from its upper-level node and lower-level node, the active period includes a downstream duration for transmitting data/commands from the sink node to the terminal node and an upstream duration for transmitting data/commands from the terminal node to the sink node, and each of the upstream and downstream durations sequentially includes RX, TX, and ACK intervals, so that bidirectional communication between the sink node and the terminal node can be performed within a single active period.

9 Claims, 8 Drawing Sheets

WIRELESS SENSOR NETWORK WITH LINEAR STRUCTURE BEING CAPABLE OF BIDIRECTIONAL COMMUNICATION AND METHOD THEREOF

This is a National Phase Application filed under 35 U.S.C. 371 as a national stage of PCT/KR2008/000133, filed Jan. 9, 2008, an application claiming the benefit of Korean Patent Application No. 10-20070008935 filed Jan. 29, 2007, the entire content of each of which is hereby incorporated by reference in its entirety.

TECHNICAL FIELD

The present invention relates to a wireless sensor network with a linear structure, and more particularly, a wireless sensor network with a linear structure which includes an upstream duration as well as a downstream duration in a single active period to allow bidirectional communication within a single period.

BACKGROUND ART

A sensor network is a core technical infrastructure for realizing a ubiquitous computing technology, and may operate by connecting each sensor node in a wired or wireless manner. Since each node of the sensor network operates using a battery having a limited capacity, it is a top priority concern to transmit sensing data with minimum energy. In addition, in order to apply the sensor network to a real-time system, time delay in a large sensor network should be minimized. Therefore, a sensor network adopting real-time monitoring is required to use a protocol having little time delay on the network while minimizing battery consumption.

Each node included in the wireless sensor network (WSN) performs tasks such as sensing of information on surrounding conditions, computing, and wireless communication using a battery having a limited capacity. If typical media access control (MAC) protocols such as MANET or IEEE802.11 are applied to the sensor network, the wireless network will experience problems in energy consumption such as packet collision/latency, overhearing, control packet overhead, and idle listening. Particularly, in the idle listening, since the sensor node operates in an active state even when a communication function is not required, large energy consumption is generated. In order to overcome these shortcomings, the MAC protocol used in the sensor network has been designed to save power consumption by operating in a sleep state during a normal condition and periodically waking up to operate in an active state. Such a method is employed in some sensor MAC protocols such as Sensor-MAC, Timeout-MAC, and B-MAC.

However, the aforementioned sensor MAC protocols are short of energy efficiency. In addition, if a duty cycle is reduced to increase energy efficiency, network delay accordingly increases. That is, since the energy efficiency and the network delay trade off each other, the aforementioned sensor network protocols would have problems when a real-time application is required with a limited capacity of the power source such as a battery.

In order to solve these problems, Korean Registered Patent Document No. 10-656385, entitled "Real-time Sensor Line Protocol" proposed a linear structure communication protocol applied to a wireless sensor network. However, according to the communication protocol proposed in the above patent document, while it is possible to generally provide an efficient wireless sensor network, it fails to provide downstream for transmitting data or commands from a sink node to a terminal node.

For this reason, the applicant is to propose a protocol capable of efficiently performing reliable bidirectional communication between the sink node and the terminal node in a wireless sensor network having a linear structure.

DISCLOSURE

Technical Problem

In order to solve the aforementioned problems, the present invention provides a sensor network with a linear structure capable of providing bidirectional communication.

Also, the present invention provides a communication method capable of providing bidirectional communication in a sensor network with a linear structure.

Technical Solution

According to an aspect of the present invention, there is provided a wireless sensor network comprising a plurality of nodes linearly connected from a sink node to a terminal node by connecting each node to a single upper-level node and a single lower-level node, wherein an active period and an inactive period each of which has a predetermined time length are sequentially repeated in each node;

wherein the active period sequentially includes a downstream duration for transmitting data/commands from the sink node to the terminal node, an intermission duration, and an upstream duration for transmitting data/commands from the terminal node to the sink node; and wherein each of the downstream duration and the upstream duration sequentially includes a receive (RX) interval, a transmit (TX) interval, and an acknowledgement (ACK) interval, so that bidirectional communication between the sink node and the terminal node can be performed within a single active period.

According to another aspect of the present invention, there is provided a wireless sensor network comprising a plurality of nodes linearly connected from a sink node to a terminal node by connecting each node to a single upper-level node and a single lower-level node, wherein an active period and an inactive period each of which has a predetermined time length are sequentially repeated in each node;

wherein the active period sequentially includes a upstream duration for transmitting data/commands from the terminal node to the sink node, an intermission duration, and an downstream duration for transmitting data/commands from the sink node to the terminal node; and wherein each of the downstream duration and the upstream duration sequentially includes a receive (RX) interval, a transmit (TX) interval, and an acknowledgement (ACK) interval, so that bidirectional communication between the sink node and the terminal node can be performed within a single active period.

Preferably, data/commands are transmitted in a synchronous state that the downstream duration and the upstream duration are synchronized with each other, wherein a TX interval of a parent node is synchronized with an RX interval of a child node, and a TX interval of a child node is synchronized with an ACK node of a parent node during the downstream duration of the active period, and wherein a TX interval of a child node is synchronized with an RX interval of a parent node, and a TX interval of a parent node is synchronized with an ACK interval of a child node during the upstream duration of the active interval.

Preferably, the intermission duration of each node is determined based on the number of hops included in the entire network and its depth.

According to another aspect of the present invention, there is provided a method of transmitting/receiving bidirectional data in a wireless sensor network, the method comprising:

(a) each node receiving data/commands from a parent node by synchronizing, a TX interval of the parent node with its RX interval and synchronizing its TX interval with an ACK interval of the parent node during the downstream duration; and (b) each node transmitting data/commands to the parent node by synchronizing its TX interval with an RX interval of the parent node and synchronizing a TX interval of the parent node with its ACK interval during the upstream duration, so that bidirectional communication of data/commands between the sink node and the terminal node can be performed within a single active period.

Preferably, if a new external node is to join in the wireless sensor network, the method of transmitting/receiving bidirectional data in a wireless sensor network includes:

(a) the new node scanning nodes included in the network to find the terminal node and transmitting a join request message to the found terminal node;

(b) the terminal node transmitting an increase-hop request message to the sink node via upper-level middle nodes;

(c) the sink node increasing the number of hops in response to the received increase-hop message, transmitting the increase-hop response message to the terminal node via lower-level middle nodes, and updating its intermission duration;

(d) the middle nodes receiving messages from their upper-level nodes and transmitting the received messages to a lower-level node, and updating their intermission durations based on the modified number of hops;

(e) the terminal node receiving the increase-hop response message from the sink node, updating its intermission duration, and transmitting a join response message to the new node; and (g) the new node receiving the join response message, determining its intermission duration based on the number of hops and its depths, changing to a synchronous state depending on the determined intermission duration, and becoming a terminal node during the next period.

Preferably, in the method of transmitting/receiving bidirectional data in a wireless sensor network, if any node fails to transmit/receive a message to/from its parent node, the network is recovered by:

(a) the node determining that a link has failed, changing to a state capable of transmitting/receiving data to/from its grandparent node, and transmitting a recovery request message to the grandparent node;

(b) the grandparent node changing to a state capable of transmitting/receiving data to/from its upper-level node and the node, and transmitting the recovery request message to the sink node via middle nodes;

(c) the sink node receiving the recovery request message, decreasing the number of hops included in the entire network, transmitting a decrease-hop command, and rearranging its intermission duration;

(d) the middle nodes interposed between the sink node and the grandparent node rearranging their intermission duration based on the modified number of hops;

(e) the grandparent node receiving the decrease-hop command, changing to a synchronous state, rearranging its intermission duration based on the modified number of hops, and transmitting a recovery response message to the node;

(f) the node receiving the recovery response message, transmitting a backward shift command to a lower-level node, and changing to a synchronous state; and (g) backwardly shifting all lower-level nodes from the node to the terminal node.

According to another aspect of the present invention, there is provided a method of transmitting/receiving bidirectional data in a wireless sensor network, the method comprising:

(a) each node transmitting data/commands to a parent node by synchronizing its TX interval with an RX interval of the parent node and synchronizing a TX interval of the parent node with its ACK node during an upstream duration; and (b) each node receiving data/commands from a parent node by synchronizing a TX interval of the parent node with its RX interval and synchronizing its TX interval with an ACK interval of the parent node, so that bidirectional communication of data/commands can be performed within a single active period.

Preferably, if a new external node is to join in the wireless sensor network, the method of transmitting/receiving bidirectional data in a wireless sensor network includes:

(a) the new node scanning nodes included in the network to find the terminal node and transmitting a join request message to the found terminal node;

(b) the terminal node transmitting a join request message and its depth information to the new node, and changing to a middle node; and (c) the new node receiving the join response message, determining its depth and intermission duration based on the depth information of the terminal node, changing to the synchronous state depending on the determined intermission duration, and becoming a terminal node during the next period.

Preferably, in the method of transmitting/receiving bidirectional data in a wireless sensor network, if any node fails to transmit/receive a message to/from its parent node, the network is recovered by:

(a) the node determining that a link has failed, changing to a state capable of transmitting/receiving data to/from a grandparent node, and transmitting an extension request message to the grandparent node;

(b) the grandparent node changing to a state capable of receiving/transmitting data to/from its upper-level node and the node in response to the extension request message, and transmitting an extension response message to the node;

(c) the grandparent node transmitting a forward shift command and a decrease depth command to the node, and changing to a synchronous state;

(d) the node receiving, the forward shift command and the decrease-depth command, and transmitting the forward shift command and the decrease-depth command to a lower-level node, and changing to a synchronous state; and (e) middle nodes interposed between the node and the terminal node rearranging their intermission durations based on their modified depths and forwardly shifting.

Advantageous Effects

According to the present,invention, bidirectional communication between the sink and terminal nodes can be provided within a single active period. As a result, it is possible for the corresponding node to receive commands from the sink node and transmit command results to the sink node within a single period. Therefore, it is possible to provide reliable bidirectional communication in a wireless sensor network according to the present invention. In addition, according to the present invention, a network configuration can be effectively managed using the depth of each node in a network having multiple hops.

According to the present invention, it is possible for the sink node to effectively collect sensing data from lower-level nodes, as well as to transmit downstream commands to a particular lower-level node or a plurality of lower-level nodes. As a result, it is possible to provide urgent retransmission of the sensing data in an emergency accident, to check the condition of the network, and to rearrange configurations, so that real-time correspondence can be performed in a wireless sensor network.

DESCRIPTION OF DRAWINGS

The above and other features and advantages of the present invention will become more apparent by describing in detail exemplary embodiments thereof with reference to the attached drawings in which.

BEST MODE

A sensor network with a linear structure and a communication method in the sensor network according to a first embodiment of the present invention will now be described in detail with reference to the accompanying drawings.

Terminologies used in this description are defined as follows: A sink node is a node which enables a WSLP bidirectional network to operate; a terminal node is a node having no child node; A middle node is a node having both parent and child nodes; A parent node, a grandparent node, a child node, and a grandchild node are an upper-level node, a subsequent upper-level node, a lower-level node, and a subsequent lower-level node, respectively, in a tree structure; A "joining" means a process of combining, nodes of the WSLP network into a single node; A "depth" means the number of access operations required to reach a desired node from a sink node; "Downstream command/data" is any command or data from a sink node to a terminal node; "Upstream command/data" is any command or data from a terminal node to a sink node; A "synchronous state" is a state that an receive (RX) interval or an acknowledgement (ACK) interval is synchronized with a transmit (TX) interval of the parent node; A "Data extended state" is a state that an RX interval or an ACK interval is synchronized with a TX interval of a grandchild node; An "Acknowledgement extended state" is a state that an RX interval or an ACK interval is synchronized with a TX interval of a grandparent node; and An "Uplink recovery state" is a state that a request for changing to a data extended state is issued to a grandparent node.

Figure 1:
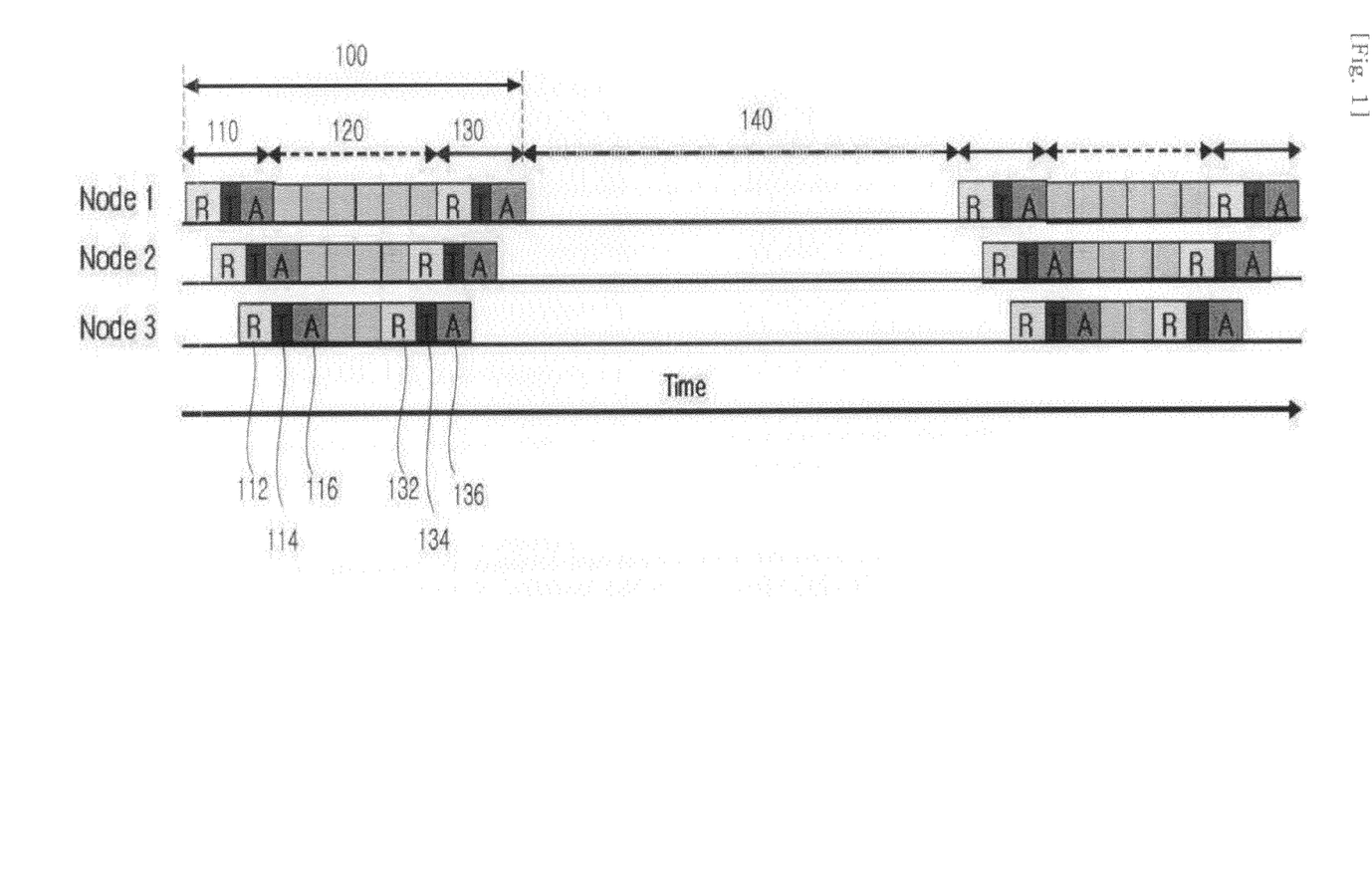
FIG. 1 is a packet diagram illustrating a data transmit/receive structure of a wireless sensor network according to a first embodiment of the present invention.

FIG. 1 is a packet diagram illustrating TDMA packets in a sensor network of a linear structure according to a first embodiment of the present invention. Referring to FIG. 1, an active period 100 and an inactive period 140 each having a predetermined time length are repeated in each node of the sensor network according to the present invention. The active period 100 includes a downstream duration 110, an intermission duration 120, and an upstream duration 130. Each of the downstream duration 110 and the upstream duration 130 sequentially includes a RX interval 112, 132, a TX interval 114, 134, and an ACK interval 116, 136, respectively.

On the other hand, each data packet transmitted or received by each node preferably includes its own identification and link direction information. The link direction information indicates a propagation direction of a corresponding packet, e.g., any one of the downstream duration and the upstream duration.

If the sensor network includes n nodes (i.e., the first node, the second node, . . . , the nth node), the first to nth nodes are linearly connected, the first node is also called a sink node, and the bottommost nth node is also called a terminal node. During the downstream duration 110 of the active period, the sink node transmits commands to the terminal node. During the upstream duration 130, the terminal node transmits data to the sink node in response to the command from the sink node.

Hereinafter, a process of transmitting commands from the sink node to the terminal node during the downstream duration in a synchronous state will be described. During the downstream duration 110, each node of the sensor network operates as a parent node with respect to its lower-level node, and operates as a child node with respect to its upper-level node. Therefore, the parent node and the child node are synchronized such that the RX interval of the parent node is synchronized with the TX interval of the child node, while the TX interval of the child node is synchronized with the ACK interval of the parent node. Therefore, the parent node receives commands from its upper-level node during the RX interval (S100), and transmits the received commands to its child node during the TX interval (S102). At the same time, the parent node transmits an ACK signal to its upper-level node (S104). On the other hand, the child node receives commands from its parent node, during the RX interval, and transmits the received commands to its lower-level node during the TX interval (S108). At the same time, the child node transmits an ACK signal to its parent node (S106). As a result, the parent node receives the ACK signal from the child node during the ACK interval of the downstream duration, so as to be notified that the data receive/transmit operation is normally completed.

Hereinafter, a process of transmitting data from the terminal node to the sink node during the upstream duration will be described. During the upstream duration, the parent and child nodes are synchronized with each other such that the RX interval of the child node is synchronized with the TX interval of the parent node and the TX interval of the parent node is synchronized with the ACK interval of the child node. Therefore, the child node receives data from the lower-level node during the RX interval, and transmits the received data to the parent node (S110). At the same time, the child node transmits an ACK signal to a lower-level node (S112). On the other hand, the parent node receives data from the child node during the RX interval, and transmits the received data to its upper-level node during the TX interval (S114). At the same time, the parent node transmits an ACK signal to the child node (S116). As a result, the child node receives the ACK signal from the parent node during the ACK interval of the upstream duration, and is notified that the data receive/transmit operation is normally completed. The sink node transmits commands to the terminal node or receives data from the terminal node. Also, the sink node controls data receive/transmit operation between nodes connected in the entire network, or manages link conditions between the nodes. Each node manages information on the number of hops included in the entire network and its corresponding depth.

The intermission duration of each node is determined based on the number of hops included in the entire network and its corresponding depth. For example, if the number of hops included in a network is n, the intermission duration of the terminal node having a depth of n is always formed of two time intervals, and the intermission duration of the parent node of the terminal node having a depth of (n−1) is formed of 4 time intervals. Therefore, if the number of hops included in the entire sensor network is n, the intermission duration I of a node having a depth of k is determined as follows:

$$I=(\text{total hop}-\text{depth}+1)*2*\text{blank duration}$$ [Equation 1]

where, a blank duration is a predetermined time length that can be set up by a system administrator or a designer or adequately adjusted depending on performance or specification of the system.

As shown in FIG. 1, the sensor network according to the present invention has both of the downstream duration for transmitting commands and the upstream duration for transmitting data from each node in a single period. Therefore, the sink node can transmit commands as well as receive processing results for the commands within a single period.

Hereinafter, a process of joining a new node in an existing sensor network according to the present invention will be described with reference to FIG. 2. For simplicity of description, it is assumed that the network includes three nodes, i.e., a sink node, a middle node, and a terminal node connected in a linear manner.

Figure 2:
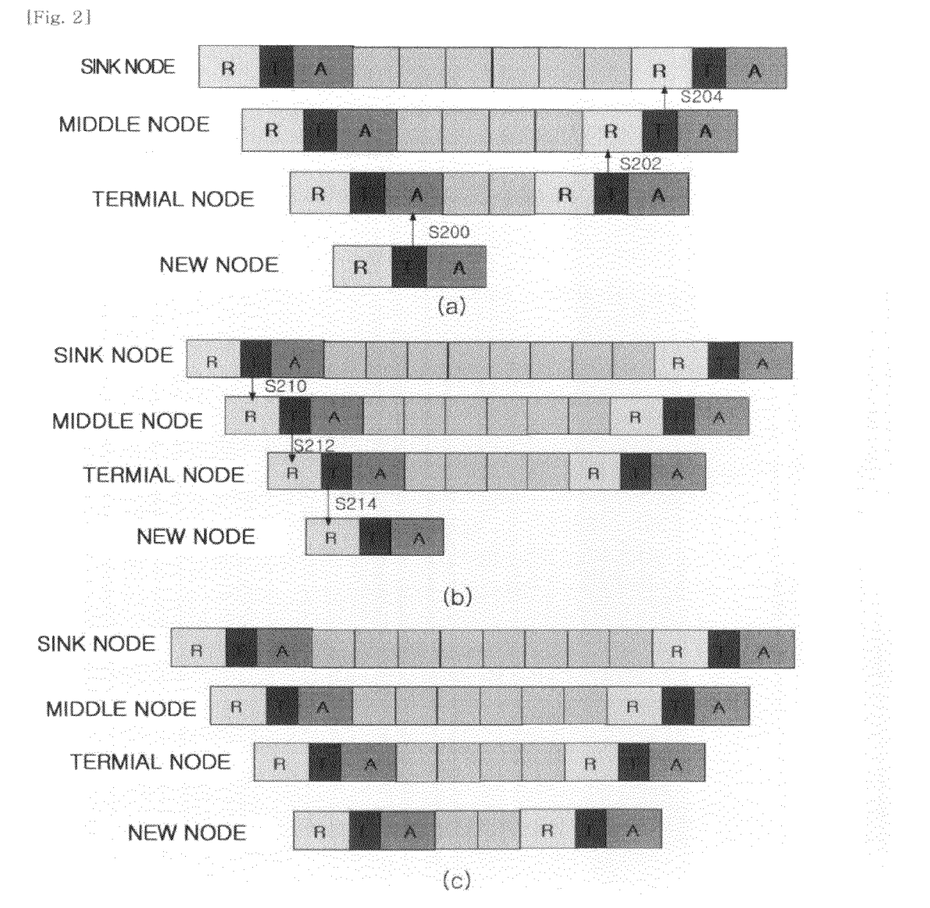
FIG. 2 is a, packet diagram illustrating a process of joining a new node in a wireless sensor network according to a first embodiment of the present invention.

Referring to FIG. 2(a), a new node to be connected to a network scans surrounding nodes to find a terminal node of the corresponding network, and then, achieves time synchronization with the terminal node. Then, the new node transmits a join request message to the terminal node during a TX interval of a downstream duration (S200). The terminal node transmits an increase-hop request message to the middle node, i.e., an upper-level node, during a TX interval of the upstream duration (S202). The middle node relays the message received from the terminal node to the, sink node, i.e., an upper-level node (S204), and the sink node receives the increase-hope request message during the RX interval of the upstream duration.

Referring to FIG. 2(b), in a subsequent period, the sink node increases the number of hops, transmits an increase-hope response message during the TX interval of the downstream duration (S210), and updates its intermission duration. The increase-hop response message includes a number-of-hop modification command. The middle node transmits to the terminal node, i.e., a lower-level node, the message received from the sink node during the RX interval of the downstream duration (S212), and updates its intermission duration based on the modified number of hops. The terminal node that has received the increase-hop response message from the middle node updates its intermission duration based on the modified number of hops, and transmits a join response message to the new node during the TX interval of the downstream duration (S214).

Referring to FIG. 2(c), the new node that, has received the join response message from the terminal node during the RX interval of the downstream duration determines its intermission duration based on the number of hops and its depth, and changes into a synchronous state depending on the determined intermission duration, so that the new node becomes a terminal node during the next period.

Hereinafter, a link recovery process according to the present invention will be described with reference to FIG. 3. The link recovery process is a process for recovering a link of the middle node in a topology of the entire network if it is determined that the link is disconnected. For simplicity of description, it is assumed that the entire network includes five nodes, i.e., a sink node, a first node, a second node, a third node, and a terminal node, and the second node is disconnected.

Figure 3:
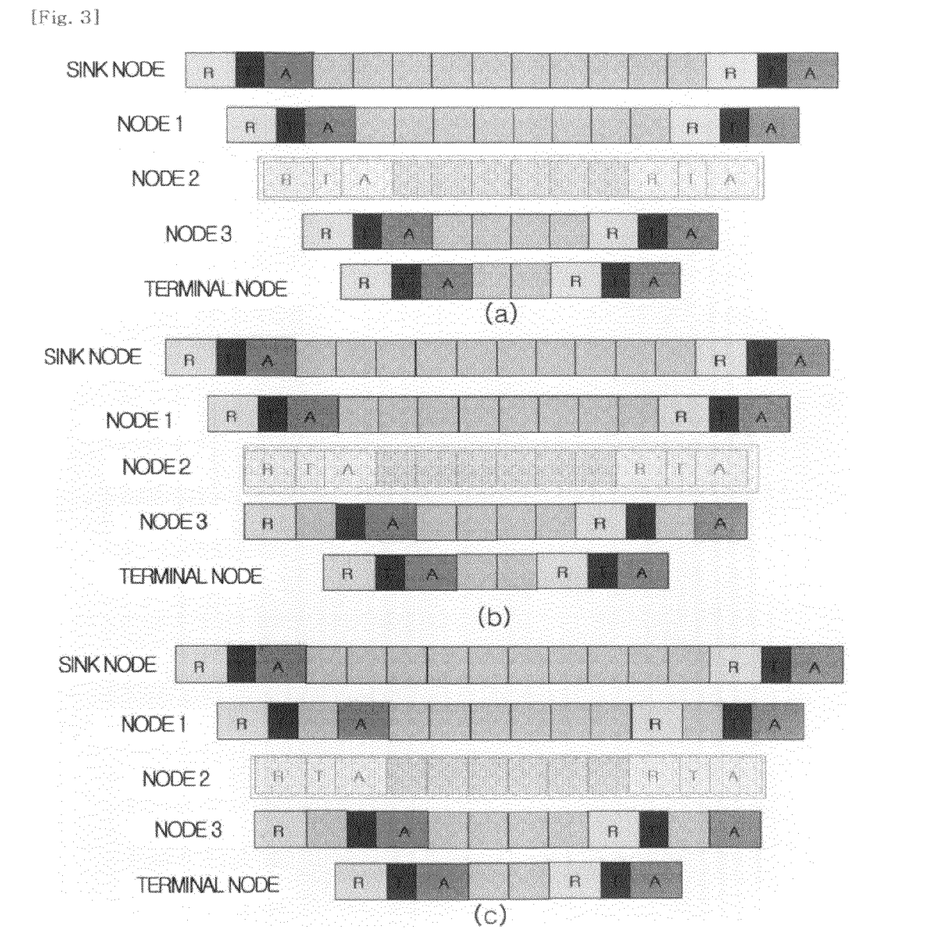
FIG. 3 and FIG. 4 are packet diagrams illustrating a process of recovering any unconnected link in a wireless sensor network according to a first embodiment of the present invention.

Referring to FIG. 3(a), when the third node fails to receive a message from the second node during the RX interval of the downstream duration, it is determined that the, third node fails to obtain the uplink.

Referring to FIG. 3(b), the third node becomes a state capable of transmitting/receiving data to/from its grandparent node, transmits a recovery request message to the grandparent node, and request change to the data extended state.

Referring to FIG. 3(c), the grandparent node, i.e., the first node, that has received the request to change to the data extended state changes to a condition capable of transmitting/receiving data to/from its upper-level node and the third node, and transmits the recovery request message to the sink node via upper-level middle nodes.

Figure 4:
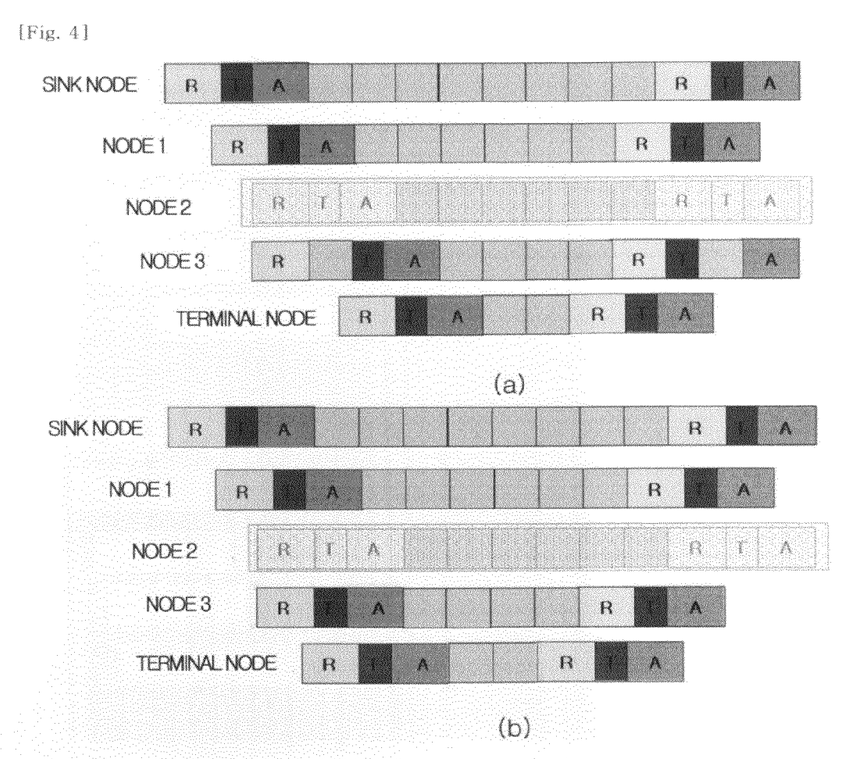

Referring to FIG. 4(a), during the next period, the sink node that has received the recovery request message via the first node and the middle nodes reduces the number of hops, transmits a decrease-hop command, and adjusts its intermission duration based on the reduced number of hops. Subsequently, the middle nodes interposed between the sink node and the first node adjust their intermission durations using the number of hops modified in response to the decrease-hops command from the sink node. The first node that has received the decrease-hop command changes to a synchronous state, adjusts its intermission duration based on the modified number of hops, and transmits a recovery response message to the third node.

Referring to FIG. 4(b), the third node that has received the recovery response message from the first node transmits a backward shift command to its lower-level nodes, and then, changes to a synchronous state. Preferably, all lower-level nodes from the third node to the terminal node are backwardly shifted in response to the backward shift command from the first node to recover the entire network.

Mode for Invention

Hereinafter, a sensor network with a linear structure and a communication method in the sensor network according to a second embodiment of the present invention will be described in detail with reference to FIGS. 5 to 8, where descriptions of parts similar to the first embodiment will be omitted.

Figure 5:
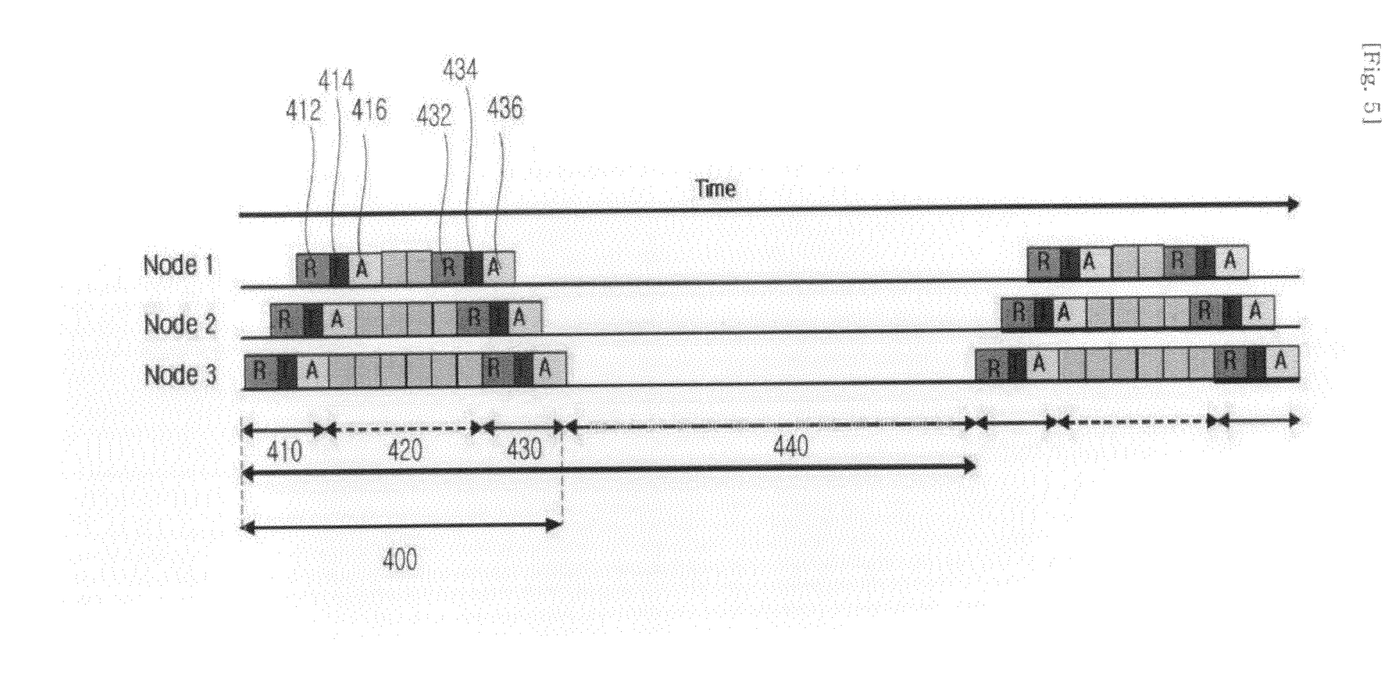
FIG. 5 is a packet diagram illustrating a data transmit/receive structure of a wireless sensor network according to a second embodiment of the present invention.

FIG. 5 is a packet diagram illustrating TDMA packets in a sensor network with a linear structure according to a second embodiment of the present invention. Referring to FIG. 5, an active period 400 and an inactive period 440 each having a predetermined time length are repeated in each node of the sensor network according to the present invention. The active period 400 includes an upstream duration 410, an intermission duration 420, and a downstream duration 430. Each of the upstream duration 410 and the downstream duration 430 sequentially includes a RX interval 412, 432, a TX interval 414, 434, and an ACK interval 416, 436.

On the other hand, in the communication network according to the present invention, an intermission duration I of a node having a depth of k and n hops in the entire network can be determined as follows:

$$I = (depth+1) * 2 * blank\ duration \qquad [\text{Equation 2}]$$

Hereinafter, a process of connecting a new node to an existing sensor network according to the embodiment of the present invention will be described with reference to FIG. 6. For simplicity of description., the network includes three nodes, i.e., a sink node, a middle node, and a terminal node connected in a linear manner.

Figure 6:
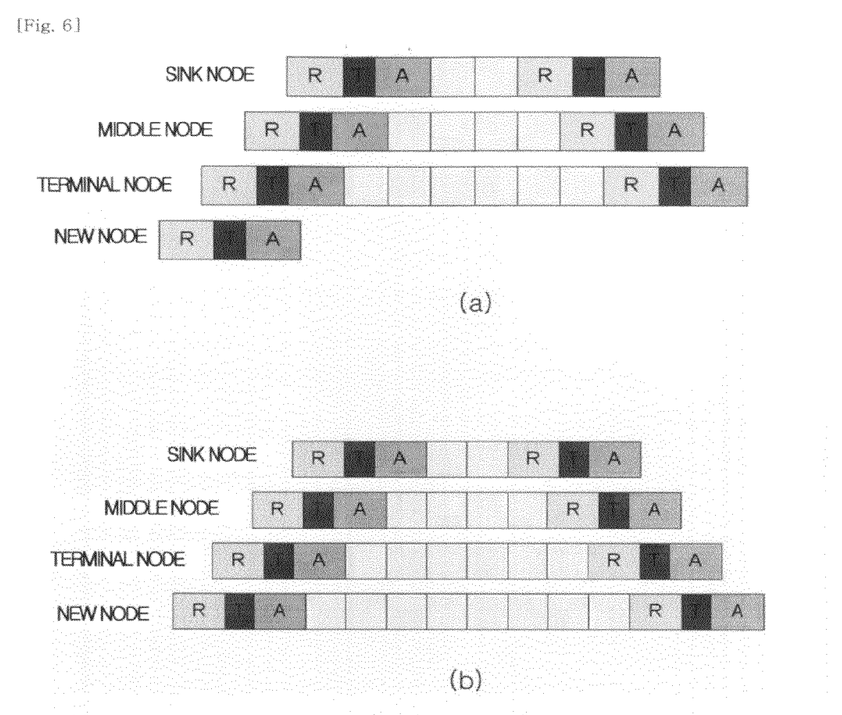
FIG. 6 is a packet diagram illustrating a process of joining a new node in a wireless sensor network according to a second embodiment of the present invention.

Referring to FIG. 6(*a*), a new node to be connected to the network scans surrounding nodes to find a terminal node of its corresponding network, and achieves time synchronization with the terminal node. Then, referring to FIG. 6(*b*), the new node transmits a join request message to the terminal node during the TX interval of the upstream duration. The terminal node transmits a join response command to the new node during the TX interval of the upstream duration. The new node receives the join response command during the ACK interval of the upstream duration, adjusts its intermission duration, and changes to a synchronous state, so as to become a terminal node during the next period.

Hereinafter, a link recovery process according to the present invention will be described with reference to FIGS. 7 and 8. The link recovery process is a process of recovering an unconnected link of the middle node in a topology of the entire network. For simplicity of description, it is assumed that the entire network includes 6 nodes, i.e., a sink node, a first node, a second node, a third node, a fourth node, and a terminal node., and the second node is disconnected.

Figure 7:
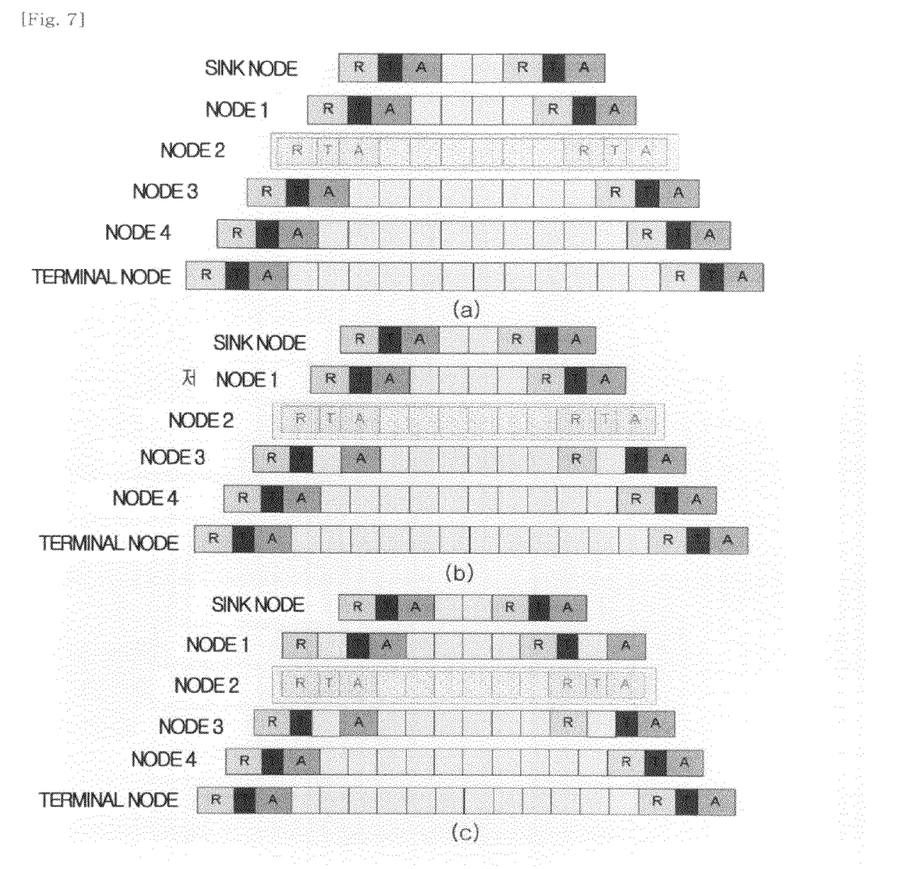
FIGS. 7 and 8 are packet diagrams illustrating a process of recovering any unconnected link in a wireless sensor network according to a second embodiment of the present invention.

Referring to FIG. 7(*a*), when the third node fails to receive a message from the second node during the RX interval of the downstream duration, it is determined that the uplink communication of the third node has failed. Referring to FIG. 7(*b*), the third node changes to an uplink recovery state capable of transmitting/receiving data to/from its grandparent node, and transmits an extension request command to the first node, i.e., its grandparent node. Referring to FIG. 7(*c*), the first node changes to a state capable of transmitting/receiving data to/from its upper-level node and the third node in response to the extension request command.

Figure 8:
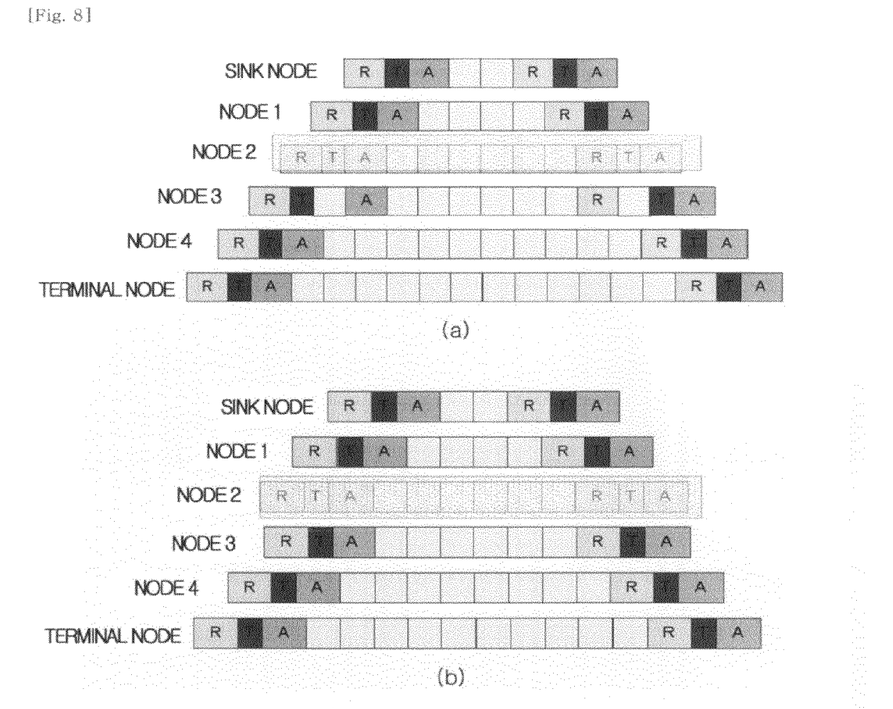

Referring to FIG. 8(*a*), during the next period, the first node transmits a forward shift command and a decrease-depth command to the third node, and returns to a synchronous state.

Referring to FIG. 8(*b*), during the next period, the third node transmits a forward shift command to its lower-level node, adjust its intermission duration, and changes to a synchronous state. Then, the middle node sequentially relays the command to the terminal node, and the middle nodes and the terminal node forwardly shift. Also, the intermission duration is adjusted. Finally, the recovery process is completed.

While the present invention has been particularly shown and described with reference to exemplary embodiments thereof, it will be understood by those of ordinary skill in the art that various changes and modifications in form and details may be made therein without departing from the spirit and scope of the present invention as defined by the following claims.

Industrial Applicability

The present invention can be widely used in a wireless sensor network including a plurality of sensor nodes.

The invention claimed is:

1. A wireless sensor network comprising a plurality of nodes linearly connected from a sink node to a terminal node by connecting each node to a single upper-level node and a single lower-level node,
   wherein each node has an active period for transmitting/receiving data to/from its upper-level node and lower-level node, and
   wherein the active period includes a downstream duration for transmitting data/commands from the sink node to the terminal node and an upstream duration for transmitting data/commands from the terminal node to the sink node, and an intermission duration between the downstream duration and the upstream duration,
   wherein no data is transmitted/received to/from its upper-level node during the intermission duration,
   wherein the intermission duration of each node is determined based on a depth of the node and the number of hops included in the entire network,
   wherein each of the downstream duration and the upstream duration includes a receive (RX) interval, a transmit (TX) interval, and an acknowledgement (ACK) interval, and
   wherein all the nodes linearly connected from the sink node to the terminal node perform bidirectional communication within a single active period.

2. The wireless sensor network according to claim 1, wherein data packets transmitted/received by each node of the wireless sensor network have a node identification and link direction information, and the link direction information indicates any one of the downstream duration and the upstream duration.

3. The wireless sensor network according to claim 1, wherein data/commands are transmitted in a synchronous state that the downstream duration and the upstream duration are synchronized with each other,
   wherein a TX interval of a parent node is synchronized with an RX interval of a child node, and a TX interval of a child node is synchronized with an ACK node of a parent node during the downstream duration of the active period, and
   wherein a TX interval of a child node is synchronized with an RX interval of a parent node, and a TX interval of a parent node is synchronized with an ACK interval of a child node during the upstream duration of the active interval.

4. A wireless sensor network comprising a plurality of nodes linearly connected from a sink node to a terminal node by connecting each node to a single upper-level node and a single lower-level node,
   wherein an active period and an inactive period each of which has a predetermined time length are repeated in each node;
   wherein the active period sequentially includes a downstream duration for transmitting data/commands from the sink node to the terminal node, an intermission duration, and an upstream duration for transmitting data/commands from the terminal node to the sink node; and
   wherein each of the downstream duration and the upstream duration includes a receive (RX) interval, a transmit (TX) interval, and an acknowledgement (ACK) interval,
   wherein the intermission duration of each node is determined based on the number of hops included in the entire network and its depth; and
   wherein all the nodes linearly connected from the sink node to the terminal node perform bidirectional communication within a single active period.

5. A wireless sensor network comprising a plurality of nodes linearly connected from a sink node to a terminal node by connecting each node to a single upper-level node and a single lower-level node, wherein an active period and an inactive period each of which has a predetermined time length are sequentially repeated in each node;

wherein the active period sequentially includes an upstream duration for transmitting data/commands from the terminal node to the sink node, an intermission duration, and a downstream duration for transmitting data/commands from the sink node to the terminal node; and wherein each of the downstream duration and the upstream duration includes a receive (RX) interval, a transmit (TX) interval, and an acknowledgement (ACK) interval, wherein the intermission duration of each node is determined based on the number of hops included in the entire network and its depth; and wherein all the nodes linearly connected from the sink node to the terminal node perform bidirectional communication within a single active period.

6. A method of transmitting/receiving bidirectional data in a wireless sensor network having a plurality of nodes connected in a linear manner from a sink node to a terminal node, wherein an active period of each node includes a downstream duration for transmitting data/commands from the sink node to the terminal node, and an upstream duration for transmitting data/commands from the terminal node to the sink node, and an intermission duration between the downstream duration and the upstream duration, the method comprising:

(a1) each node receiving data/commands from its upper-level node and transmitting the data/commands to its lower-level node during the downstream duration; and (a2) each node receiving data/commands from its lower-level node and transmitting the data/commands to its parent node during the upstream duration, and (a3) each node determining its intermission duration based on the number of hops included in the entire network and its depth, and interposing the intermission duration between the downstream duration and the uplink duration, wherein all the nodes linearly connected from the sink node to the terminal node perform bidirectional communication within a single active period.

7. The method according to claim 6, further comprising, if a new external node is to join in the wireless sensor network:

(b1) the new node scanning nodes included in the network to find the terminal node and transmitting a join request message to the found terminal node;

(b2) the terminal node transmitting an increase-hop request message to the sink node via upper-level middle nodes;

(b3) the sink node increasing the number of hops in response to the received increase-hop message and transmitting the increase-hop response message to the terminal node via lower-level middle nodes;

(b4) the terminal node receiving the increase-hop response message from the sink node and transmitting a join response message to the new node; and (b5) the new node receiving the join response message, changing to a synchronous state, and becoming a terminal node during the next period.

8. The method according to claim 6, wherein, if any node fails to transmit/receive a message to/from its parent node, the network is recovered by:

(c1) the node determining that a link has failed, changing to a state capable of transmitting/receiving data to/from its grandparent node, and transmitting a recovery request message to the grandparent node;

(c2) the grandparent node transmitting the recovery request message to the sink node via its upper-level nodes;

(c3) the sink node receiving the recovery request message, decreasing the number of hops included in the entire network, and transmitting a decrease-hop command;

(c4) the grandparent node receiving the decrease-hop command, changing to a synchronous state, and transmitting a recovery response message to the node;

(c5) the node receiving the recovery response message, transmitting a backward shift command to a lower-level node, and changing to a synchronous state; and (c6) backwardly shifting all lower-level nodes from the node to the terminal node.

9. The method according to claim 6 further comprising all nodes included in the wireless sensor network determining intermission durations based on their depths and the number of hops information transmitted from the sink node, and interposing the intermission duration between the downstream and upstream durations.

* * * * *